United States Patent [19]
Voelker

[11] Patent Number: 5,856,981
[45] Date of Patent: Jan. 5, 1999

[54] RELIABLE CONNECTION ORIENTED NETWORKS

[75] Inventor: John Alvan Voelker, Aurora, Ill.

[73] Assignee: Lucent Technologies Inc., Murray Hill, N.J.

[21] Appl. No.: 856,895

[22] Filed: May 15, 1997

[51] Int. Cl.[6] .................................................. G06F 11/00
[52] U.S. Cl. ............................................................. 371/20.1
[58] Field of Search ................................. 371/20.1, 20.6; 395/182.01, 182.02; 370/468, 471, 432

[56] References Cited

U.S. PATENT DOCUMENTS

| 5,282,202 | 1/1994 | Bernstein et al. | 370/468 |
| 5,617,417 | 4/1997 | Sathe et al. | 370/394 |

*Primary Examiner*—Vincent P. Canney

[57] ABSTRACT

When protected network connections on a connection oriented network are disrupted because a network resource fails (e.g. the severing of a fiber cable upon which multiple links are multiplexed), they must be rerouted around the network failure. This invention expedites this rerouting and permits it to be carried out in a distributed manner similar to conventional routing. Advantageously, the amount of link bandwidth reserved for rerouting of failed connections is reduced relative to conventional methods.

For each protected connection, for each anticipated failure condition, a "contingent path" is selected shortly after the connection is established. This contingent path is then used to reroute that connection in the event of the occurrence of that failure condition. To the extent that only one of the anticipated for network failures occurs at a time (possibly affecting many links, and all connections using those links), the corresponding set of activated contingent paths will all fit within the reserved bandwidth of each link. This follows from the rules used in the prior selection of the contingent paths whereby link reserved bandwidth is allocated to contingent paths on the basis of anticipated failure conditions. Advantageously, in case of a network failure, most or all protected connections can be re-established on the first try.

8 Claims, 7 Drawing Sheets

CONTINGENT RESOURCE ALLOCATION AT A NODE N, FOR FACILITIES IT CONTROLS, ON BEHALF OF FAILURE CONDITION #1 AND #2 (FC #1) AND (FC #2)

| TRUNK DATA INDEPENDENT OF FAILURE CONDITION (FC) | TRUNK OR FACILITY ID | 1 | 2 | 3 | 4 | 5 |
|---|---|---|---|---|---|---|
| | TOTAL BW RESERVED FOR REROUTE ON THE TRUNK | 10 | 6 | 12 | 8 | 8 |
| FC #1 | BW ALREADY ALLOCATED FOR REROUTE FOR FC #1 | 9 | 4 | 10 | 0 | 0 |
| | RESIDUAL BW AVAILABLE FOR FUTURE ALLOCATION TO CONTINGENT ROUTES FOR FC #1 | 1 | 2 | 2 | 8 | 8 |
| FC #2 | BW ALREADY ALLOCATED FOR REROUTE FOR FC #2 | 10 | 3 | 4 | 0 | 5 |
| | RESIDUAL BW AVAILABLE FOR FUTURE ALLOCATION TO CONTINGENT ROUTES FOR FC #2 | 0 | 3 | 8 | 8 | 3 |
| CONNECTIONS, IN GENERAL ORIGINATED AT OTHER NODES, THAT MAY SEEK CONTINGENT ROUTES USING FACILITIES OF NODE n. "FC1" IN A BOX MEANS THAT THE RESPECTIVE CONNECTION HAS RESERVED THE RESPECTIVE FACILITY AS PART OF A PATH CONTINGENT UPON A FAILURE IN FC #1. ANALOGOUS MEANING TO "FC2". | CONNECTION #1, BW=3 | | FC1, 2 | | | |
| | CONNECTION #2, BW=4 | FC1 | | FC2 | | |
| | CONNECTION #3, BW=1 | | FC1 | | | |
| | CONNECTION #4, BW=10 | FC2 | | FC1 | | |
| | CONNECTION #5, BW=2 | | | | | |
| | CONNECTION #6, BW=5 | FC1 | | | | FC2 |

RELIABLE CONNECTION ORIENTED NETWORKS

TECHNICAL FIELD

This invention relates to arrangements for providing reliable data service in the presence of failures within a connection oriented network.

Problem

The use of public connection oriented networks to interconnect data users is becoming increasingly prevalent. As used herein, connection oriented networks include networks transporting voice, video, data, etc. Connection oriented networks can use both real and virtual circuits. One popular arrangements for transmitting data over these networks is the asynchronous transfer mode (ATM) which transmits data between users as a series of 53 byte cells. Using ATM and other packet oriented data transmission systems, such as frame relay, the connections between the users are over virtual circuits; a virtual circuit is one in which the path between the users is pre-defined so that all cells of the communication pass over a pre-selected group of nodes and links between those nodes. In many cases the connections are permanent virtual circuits, i.e., provisioned virtual circuits which generally remain up for an extended period of time. Most or all of the permanent virtual circuits are protected so that in case of a failure condition, the network attempts to establish an alternate path for the permanent virtual circuits.

As used herein, a route is a series of nodes for establishing connections between two end points, a path is a refinement of the route which specifies a particular link between each adjacent pair of nodes of the route, and a connection or circuit is a physical or virtual connection established over the series of links.

As more use is made of these data connections, there is an increasing demand that such data connections be reliable since businesses such as stockbrokers have come to rely on the information that is transmitted over these networks. At the same time the usual hazards which may interrupt such connections still exist. For example, construction equipment may still cut a cable interrupting all communications that are being sent over this cable. When a protected permanent virtual circuit is interrupted, it is necessary to establish a new permanent virtual circuit between the end users of that permanent virtual circuit and to do so rapidly. Even if a reserve capacity of link bandwidth were to be set aside on all links for failure conditions, establishing connections using this spare capacity is a relatively lengthy task; importantly, there are frequently conflicts between earlier and later attempts to use spare capacity for the several protected virtual circuits interrupted by a common network fault event (failure condition), such as one or more associated link failures caused by a common event, e.g., a fiber cut, or a node failure, so that the later attempts may well encounter a blockage and be required to make one or more alternate trials to establish such a connection. The net result is that new connections are set up much more slowly, and with more blockage than is required in modern data networks. This is also true of circuit networks. Accordingly, a problem of the prior art is that there is no good distributed way of responding to failures in a connection oriented network in order to establish replacement connections rapidly without setting aside excessive reserve bandwidth for failure conditions.

Solution

The above problem is substantially alleviated and an advance is made over the prior art in accordance with the teachings of applicant's invention wherein a pre-planned alternate path ("contingent path") is stored for each protected circuit or virtual circuit for every anticipated failure condition. The rules for establishing these contingent paths will guarantee that for any network link and for any failure condition, the sum of the bandwidths of all connections whose respective contingent paths for that failure condition overlays that link will not exceed the link's reserve capacity, a capacity that is defined before considering individual connections or failure conditions. Advantageously, the reserve capacity of any link will be able to accommodate all the traffic that is rerouted through that data link for any one of the anticipated trouble conditions.

A reserve capacity that normally established connections may not use is maintained for each link. When a protected connection is established, or at some convenient time thereafter, for each failure condition to which it is subject, a candidate contingent path is selected such that it can fit into the available reserve capacity of all its links for its referenced failure condition. This selection involves the originating node proposing a route, and that route being refined into a path as links, qualified by the failure condition specific reserve capacity test, are selected by nodes along the route in a hop-by-hop manner. In this way, a contingent path is derived for each anticipated failure condition that affects the protected path. For each link and each anticipated failure condition, a record of the remaining reserve capacity for that failure condition on that link is maintained. This record is tested in attempting to find a contingent path. The record is altered as that contingent path is found and only for that trouble condition. This process is repeated for each protected connection for each anticipated single failure condition. If, subsequently, one of the anticipated failure conditions occurs, a connection corresponding to the contingent path stored for each interrupted protected connections for that anticipated failure condition is established. Advantageously, this arrangement allows for a rapid establishment of new connections for protected connections in case any of the anticipated failure conditions takes place, because link bandwidth conflicts between earlier and later attempts to use reserve capacity will not occur. All invoked contingent paths will find adequate capacity at each link that they respectively use, because this capacity had been reserved against the failure condition when the contingent paths were selected.

In accordance with one feature of applicant's invention, the reserve bandwidth for any link can be changed by the network administration or management system. If for some connections/fault conditions, no reasonable contingent paths, i.e., paths which do not require an excessive number of nodes to be traversed, are available without exceeding a link/failure condition reserve limit, then the reserve limit of one or more appropriate links can be raised. There is no problem in increasing the reserve limit for a link if the present set of connections currently using the link collectively require less bandwidth than the link capacity less the proposed enlarged reserve capacity. Otherwise, the reserve limit is nominally raised, and as traffic leaves that link it is not replaced until the enlarged reserve limit is in fact available; only then will the newly enlarged limit be used in selecting contingent paths. Therefore, increasing the reserve capacity on a link is always possible, although the process may involve waiting for the normal deallocation of connections to free up sufficient bandwidth. Conversely, if the reserve capacity for a particular link is substantially higher than what is needed for acquiring contingent paths, then the reserve limit for that link can be decreased thus making more of the capacity of the link available of normal traffic.

Advantageously, this permits the bandwidth reservation for reroute within a complex network to be adaptable to changes in the overall traffic pattern.

DETAILED DESCRIPTION

This detailed description is in two parts. The first part is an overall summary of the actions that must be performed in order to implement applicant's invention. The second part is a description of an embodiment geared to the attached diagrams.

As used herein, a node is called the owner of a connection if it is the originating node of the connection. A node is an owner of a link (or direction of flow on a link), if the node transmits on that link and is responsible for allocating (egress) bandwidth of that link to connections and contingent paths. On links shared by a plurality of connections, the bandwidth of a connection is the data bit rate allocated for that connection. Let X represent the bandwidth of a specific connection being considered; let T represent the bandwidth of a link; let R represents the bandwidth in the link that is reserved for reroute paths; let A represent the sum of the bandwidth of all connection using a link including both original and rerouted paths; let Y(J) represent the bandwidth already allocated to contingent paths for failure condition J on a link. For simplicity, we suppress indexing T,R,A, and Y(J) by link. Y(J) and A are initially zero.

Note that a node may actually own only one direction of flow on a link (e.g., egress flow). The adaptation of this invention to either link level or link-direction level ownership of bandwidth is straightforward. The quantities T, A, R and Y(J) are maintained either per link or per link direction. A failure condition is the set of the network links or other network entities (such as nodes) subject to a common cause of the failure (e.g., a cable cut); this application only deals with defined, anticipated failure conditions. It is important that each node of the network be provided with a common definition of the set of anticipated failure conditions, and identify each member of the set with the same index, J. The reserve capacity for a link allocated against each failure condition, J, can then be accumulated regardless of the identity of the originating node of a contingent path request. Then, when an anticipated failure condition occurs, and contingent connections and established, the bandwidth demands placed on the links, Y(J), will be as anticipated when the contingent paths were selected. A route is the list of nodes connecting a source node to a destination node. A contingent path is the list of links connecting a source node to a destination node selected for a particular connection/failure condition pair. (Note that a pair of nodes may be connected by more than one link.)

When a connection is initially established, the owner of the connection, sometimes referred to herein as "originating node" or "source node," selects among pre-computed possible routes to the destination node and attempts to use the lowest cost such route. The routing is done using techniques well known in the prior art and tries to avoid using congested or failed links and nodes. If an attempt is made to use a particular route and the request is rejected by one of the nodes of the route, then a well known procedure called crankback is used to undo any actions performed in attempting to establish the connection over that route and the source node is notified. The source node then attempts to establish the connection using another route not dependent on the link(s) between the pair of nodes that caused the crankback. In this normal connection establishment process, a node along the route assigned by the originating node for a connection attempt tries to advance the attempt by finding a link to the next (or previous) node on the route that can accommodate the bandwidth X of the connection. A link (or link direction) can accommodate the connection only if T-R-A$\geq$X for that link. If so, the node owing the link increments the occupancy, A, of the link by X and sends the route request on to the next node. If sufficient capacity is not available on any link between the current node and the next (or previous) node of the route, then the current node initiates crankback. The crankback process received from a down stream node decrements the occupancy, A, of the link by X.

In accordance with the principles of applicant's invention, a contingent path search is performed after the initial connection has been established. Ideally, this should be done soon after the connection is established, but if the nodes are fully occupied with other work, this can be deferred until the nodes are less occupied with such other work. A contingent path search is performed for each failure condition J upon which the connection is dependent. The owner of the connection selects a contingent route for which it will attempt to get the approval of link owners along the route, which link owners will set aside reserve bandwidth for a contingent path. It selects the cheapest route (i.e., the route with the lowest cost function, a cost being assigned to each node pair of the route). The contingent path of this contingent route must avoid dependence on links that are affected by the failure condition motivating the selection of the contingent path. (The contingent route may include adjacent nodes some but not all of whose links are affected by the failure condition motivating the selection of the contingent path.) The contingent route request is sent to the next node on this route; if the request is cranked back to the originating node, another attempt is made not dependent on the node pair that caused any prior crankback. If a contingent path is successfully allocated on a set of links of the route, then a record of this contingent path, the record containing the identity of the links used in the path, is stored and has associated therewith the identity of the connection being protected and the failure condition. The identity of the contingent path is accessible from the identification of the connection in conjunction with the identification of the failure condition for the case of a fault occurring. For the case of a normal disconnect, a list of the contingent paths to be released is also needed.

The role of a node along the proposed route in refining the route into a path is as follows. First, if there is an upstream (i.e. toward the originating node) adjacent node of the route between which node and itself no link has been selected, it tries to select such a link. If that is not possible, it initiates crankback. If there is an adjacent downstream node of the route and no link between itself and that downstream node has been selected, it tries to select one. If that is not possible, and the downstream node could possibly find such a link (because of its link ownership status), the present node advances the call request to the downstream node; else it initiates crankback toward the originating node with indication of the particular node pair between which a link could not be found. If the present node is the last node of the route list and a link has been selected between it and the adjacent upstream node, then the proposed contingent route has been successfully refined to a contingent path, and the composition of that path is passed back to the originating node where it is stored.

A link can be accepted for use in the path by a node only if the link (or link direction) is owned by the node, if the link is not subject to the failure condition referenced by the contingent route, and if R-Y(J) is not less than X for the link where J is the index for this failure condition. When a link is accepted for the contingent path, its Y(J) is incremented by X. In the event of crankback, any Y(J) that had been incremented by X on behalf of that contingent path search effort is decremented by X.

When a link failure is detected, the network identifies the failure condition. All nodes owning connections disrupted by the failure condition are informed or deduce the identity of the failure condition. Then, when a connection is detected to be failed by the owner node, the combination of the connection and the failure condition is used to find the pre-computed contingent path. Rerouting of the connection is initiated using this contingent path. In response to a request to establish a connection corresponding to a contingent path, nodes owning a link of the contingent path test to see if the total link capacity, T, minus capacity allocated to existing connections, A, is greater than or equal to X, the bandwidth of the protected connection. In other words, they check to see if there is sufficient unallocated capacity in the link to accommodate the contingent connection. In this case, it is not necessary to preserve the reroute capacity, R, since the reroute capacity was allocated in order to protect against exactly this kind of failure. If sufficient unallocated capacity exists, then A is incremented by X and the route request is advanced; otherwise a crankback message is sent upstream. If a node receives a crankback request from a downstream node, it decrements allocated bandwidth, A, on the link by X. If the attempt to establish the contingent connection fails, then an attempt is made by the owning node (preferably after other contingent connections have been established) to re-establish the connection by using conventional routing tables preferably avoiding the use of a link that was part of the failed contingent connection request, and preferably avoiding links known to have failed. Link bandwidth management is performed as indicated above, i.e., by testing T-A against X.

Following a correction of the failure condition, an attempt is made to re-establish the original connections. If the path resources are successfully acquired, the connection is moved back to the original path and the reroute path resources are released. During re-establishment of the original connection, nodes which own links for the original path perform bandwidth validation tests similar to those of the initial connection request except that R, the reserve capacity, is made available to the connection. For nodes along the rerouted path being abandoned, the allocated bandwidth A is decremented by X. Link values for Y(J) are not affected. The original contingent paths are retained. Repeated attempts may be needed to restore the original path. Alternatively, an attempt can be made to establish either the original connection, or a connection of comparable cost.

When a connection is released, all table entries for both the connection path and its associated contingent paths are released in the originating node. Also, link data is updated in nodes owning links in the connection path or one of its contingent paths. In the former case, link quantity A is decremented by X. In the latter case, Y(J) is decremented by X.

Figure 1:
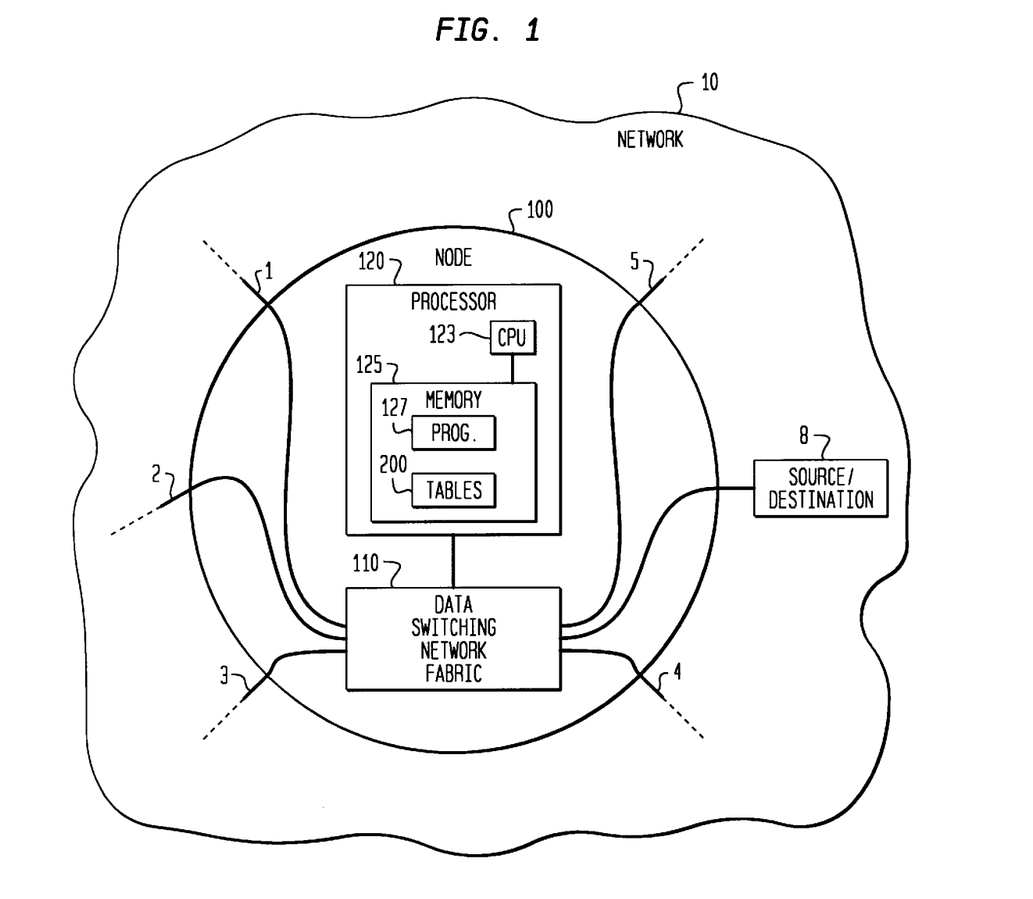
FIG. 1 is a block diagram illustrating one node of a data network.

FIG. 1 is a block diagram illustrating one node 100 of a data network 10. Connected to this node are five links 1, 2, 3, 4, 5 each of which connects this node to another node and is used for transmitting data between this node and that other node. Note that in some cases, two (or more) links may interconnect a pair of nodes. In the example, links 2 and 3 could be connected to the same destination node. Also shown is a data terminal 8 directly connected to node 100. The node includes a data switching network 110 used for switching data among the five links and also switching data to and from terminal 8.

Figure 2:
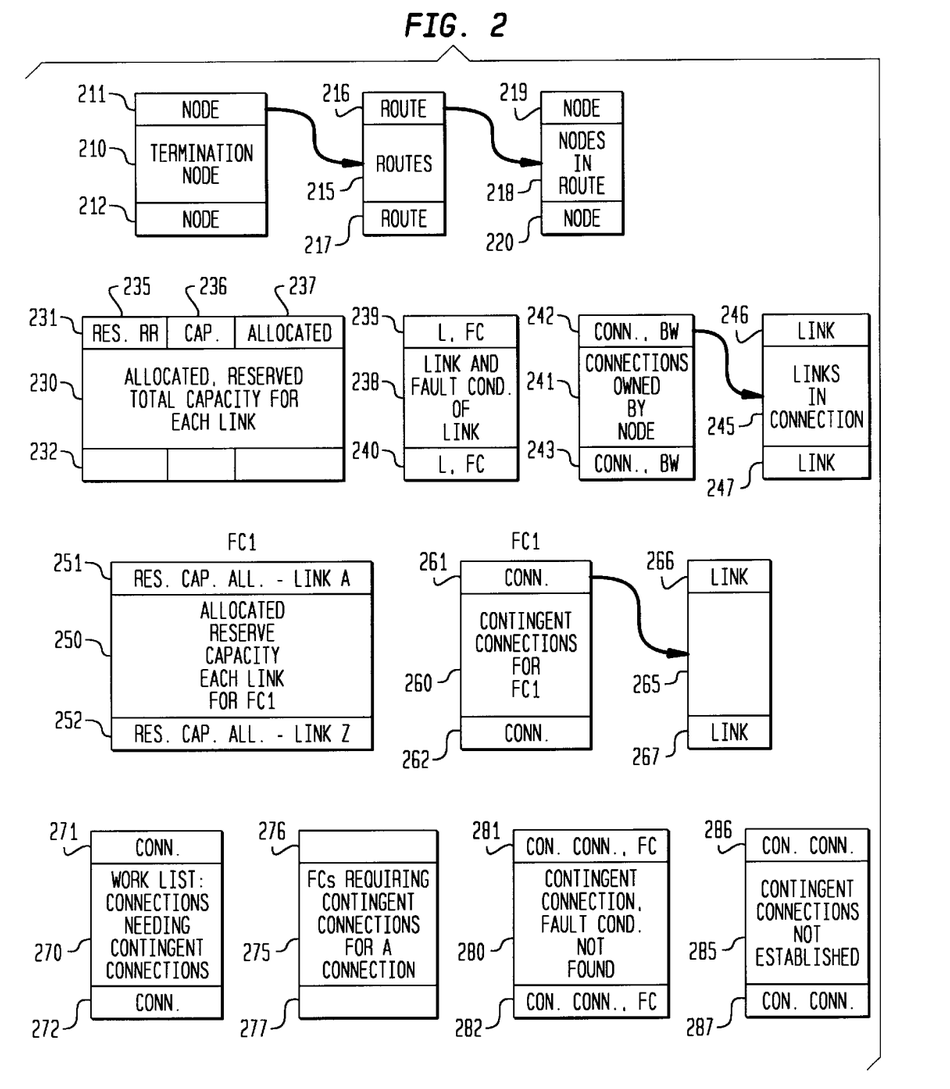
FIG. 2 is a data layout of tables used in support of one embodiment of applicant's invention.

The node is controlled by a processor 120 having a central processing unit 125 and memory 120 for storing tables 200 of data pertinent to the operations of the node and of applicants invention, and a control program 127 for controlling operations of the node. The individual tables within memory 200 are shown in FIG. 2. The anticipated failure conditions are defined across the network, i.e., failure condition 1 represents the same set of incapacitated links and/or nodes in all nodes.

Tables 210, 215 and 218, are used for hunting for a path through the network. Table 210 is a table of the terminating nodes reachable from node 100. Table 210 has entries 211, . . . , 212, one for each node. Each such entry points to a routing table such as table 215, which contains a series of routes 216, . . . 217, for reaching the destination node specified in table 210. For each route, there is another short table such as, table 218, which specifies the nodes in the route. Note that the final entry of table 218 should be the same as the node specified in table 210, since that final node is the terminating node.

Table 230 indicates, for each link owned by the node, the capacity of the link T, the allocated capacity for active paths A, and the reserve capacity set aside in order to handle failures R. Table 230, consists of a group of entries 231, . . . , 232, each entry having the data for one link. For example, entry 231 for the first link, has in entry 235 the reserve capacity set aside for failure conditions, in entry 236 the total capacity of the link, and has in entry 237 the capacity allocated for currently active paths. Normally, this allocated capacity, plus the reserve capacity should not exceed the total capacity. However, under trouble conditions the allocated capacity may reach the total capacity, at the risk of not being able to handle additional failure conditions.

Table 238 identifies the failure condition of each of the links controlled by the node. Table 238 has entries 239, . . . , 240, each specifying a link and one failure condition for that link. Table 238 suffices for the case in which each link is associated with one failure condition. For more complex cases, such as the failure of a node, special trouble reporting and analysis may be required to deduce a failure condition and to report that failure condition to all nodes.

Table 241 is a table of the connections owned by this node; it includes entries 242, . . . , 243, each entry corresponding to one connection, indicating its effective bandwidth parameters, and pointing to a table with the associated path data. For each connection there is a short path data table 245, indicating the links used in that connection. Table 245 has a series of entries 246, . . . , 247, which identify the links used in the connection.

Table 250 indicates the allocated reserve capacity Y (1) for contingent paths for each link controlled by node 100 for failure condition 1. There is a similar table (not shown) for each failure condition that affects links controlled by node 100. Table 250, has a series of entries 251, . . . 252, each entry representing the reserve capacity for one of these links allocated to contingent paths for failure condition 1.

Table 260 is a list of contingent paths which have been calculated in anticipation of failure condition 1. There is a similar table (not shown) for each failure condition that affects connections owned by node 100. Table 260 has a series of entries, 261, . . . , 262, each entry representing one contingent path. Each entry identifies a connection and points to a short table, such as table 265, that contains the links of the corresponding contingent path. Table 265 has a series of entries 266, . . . , 267, representing these links. When a contingent connection is established, the nodes cooperating in the establishment of the contingent connection are told which link to use; each such link was previously selected when the contingent path was calculated to assure an adequate reserve capacity for establishing this contingent connection on that link.

Finally, four work lists are shown which are useful in implementing applicant's invention. Work list 270 is a list of connections for which needed contingent paths have not yet been acquired. Work list 270 contains a series of entries 271, . . . , 272, each entry representing one connection owned by node 100, and pointing to an instance of work list 275.

Work list 275 is a list of failure conditions requiring the calculation of contingent connections for a specific connection. Work list 275 contains a reference to a connection and a series of entries, 276, . . . , 277, each entry representing one failure condition which may affect the connection and for which a contingent path must be calculated.

Work list 280, is a list of the connection/failure condition pairs for which no satisfactory contingent path could be calculated because of inadequate reserve capacity in some part of the network. Table 280 comprises a series of entries 281, . . . , 282, each entry representing one connection/ failure condition pair. Periodically, renewed attempts can be made to determine a satisfactory contingent path for each of these entries. Data in this table can be used as input for a decision by a network administrator to increase the reserve bandwidth R for some links in the network.

Table 285 is a work list used during the process of establishing new connections because of a failure. It comprises a series of entries 286, . . . , 287, each entry representing a connection that could not be established using what was regarded as the appropriate contingent path, or because no contingent path was available for the connection/ failure condition pair. After the contingent path method has been employed for all failed connections, those connections still left without a working path can be addressed with a fallback strategy that consists of seeking a route by conventional means using the primary routing tables, but without requiring that the reserve link capacity be maintained. Under these circumstances, routes using node pairs discovered to have inadequate spare capacity should be avoided.

Figure 3:
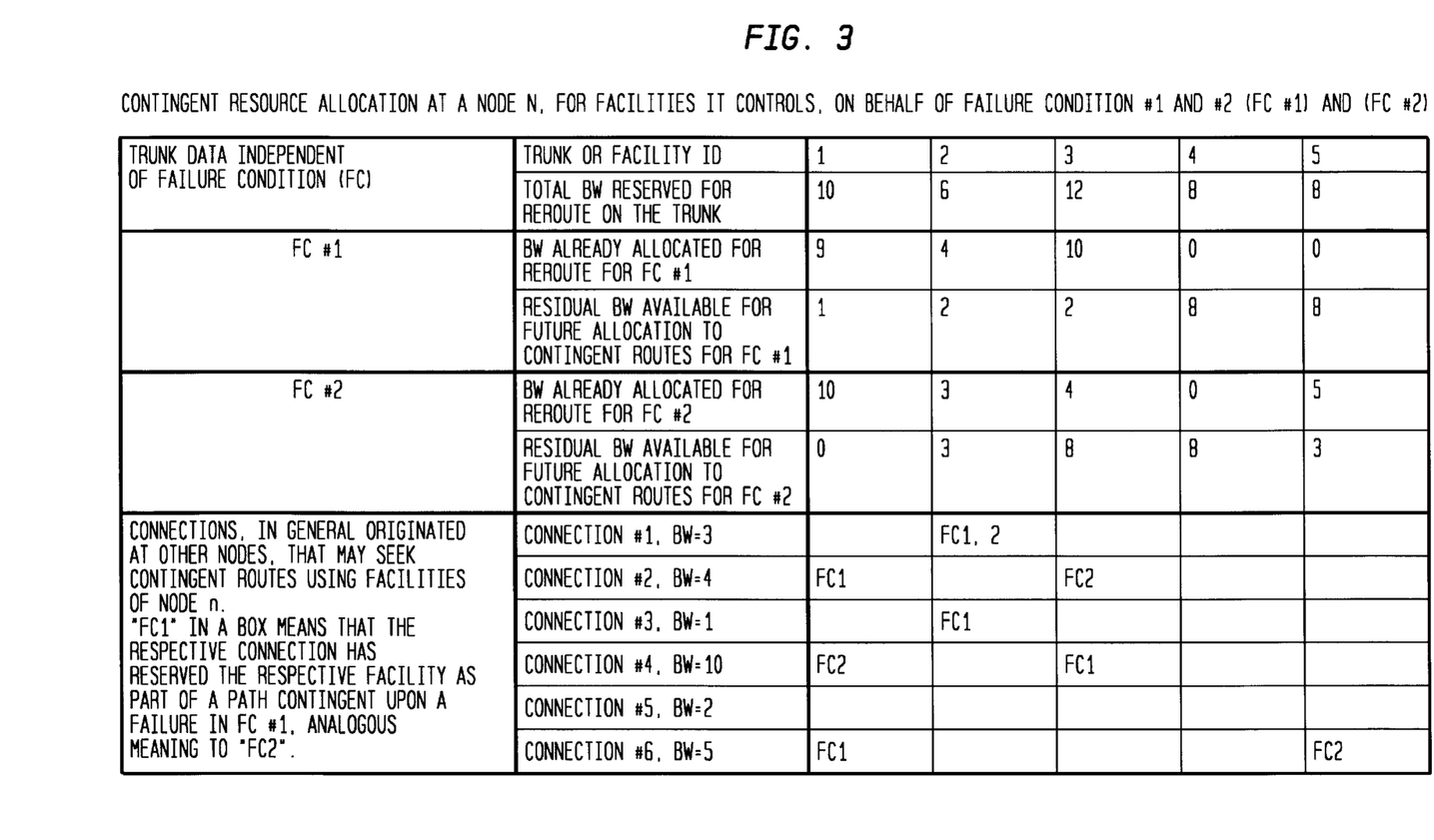
FIG. 3 is a table illustrating the relationship between total reserve capacity and capacity set aside for contingent paths for specific failure conditions and for specific protected connections in the node of FIG. 1.

FIG. 3 illustrates the allocation of contingent resources at a node for the facilities that it controls. Allocation of each direction of data flow on each link is controlled by only one of the nodes to which the link is connected. In this case, assume that node 100 controls allocation of traffic leaving the node on one of the five links and that Table 230 refers to that direction of traffic. The five columns represent the five different facilities 1, 2, 3, 4, 5. The second row represents the amount of reserve capacity set aside in the egress direction, independent of failure group, in each of the facilities in order to handle failures. The third row indicates that at this time 9, 4, 10, 0, and 0 units of capacity have already been allocated for contingent paths for failure condition 1. The fourth row represents the difference between the second and third row and indicates that 1, 2, 2, 8, 8 units of capacity are still available for future allocation to contingent paths for failure condition 1. The fifth row indicates the amount of reserve bandwidth already allocated for contingent paths for failure condition 2 in each of the five facilities, and the sixth row indicates how much reserve bandwidth is still available for contingent paths for failure condition 2. Finally, each of the last six rows is a composite of contingent path information stored in the originating node of the corresponding connections, which in total effect has resulted in the allocation of bandwidth within the reserve for the two failure conditions on the five facilities illustrated. For example, connection number 1, which requires a bandwidth of 3 and which uses facility 2 for a contingent path for both of failure conditions 1 and 2, contributes three units of allocated reserve bandwidth in facility 2 for both failure conditions 1 and 2. Note that since this is the only connection which uses facility 2 for a contingent path for failure condition 2, that this bandwidth of 3 is in fact the total bandwidth already allocated for reroute for failure condition 2 on facility 2. Note further that since facility 2 is used in a contingent path for connections 1 and 3, facility 2 already has 4 units of bandwidth allocated for rerouting paths in case of failure condition 1, and that therefore the bandwidth already allocated for reroute for failure condition 1 on facility 2 is 4 units, the sum of the bandwidth of connections 1 and 3. The entry for a particular facility and a particular failure condition is the sum of the bandwidths of contingent paths for which that facility is used in case of that failure condition. Note further that, specific connections may not require the use of any facility whose allocation is controlled by the particular node (for example connection number 5) or that a particular facility may not be used for any of the contingent paths of either failure condition (facility 4).

This application makes reference to bandwidth as a numeric quantity that can be arithmetically compared, added, and subtracted as an attribute of a connection or as a capacity of a link or as a reserved quantity on a link. It is within the existing state of the art to represent bandwidth in this way. For example, the peak cell rate, sustainable cell rate, and the burst size of an ATM connection can be used to numerically compute an approximate equivalent bandwidth for the connection on a link. It is also possible to apply this invention using a method that describes the ability to fit a set of connections onto a link, without violating any quality of service criterion for any of the connections, where this method uses multiple numbers to summarize the bandwidth allocation status of the link in terms of characteristics of the link and the several connections allocated to it. That is, equivalent bandwidth may be a multidimensional quantity. For simplicity, in this application, we refer to bandwidth as a simple numeric quantity subject to ordinary arithmetic operations and comparison.

Figure 4:
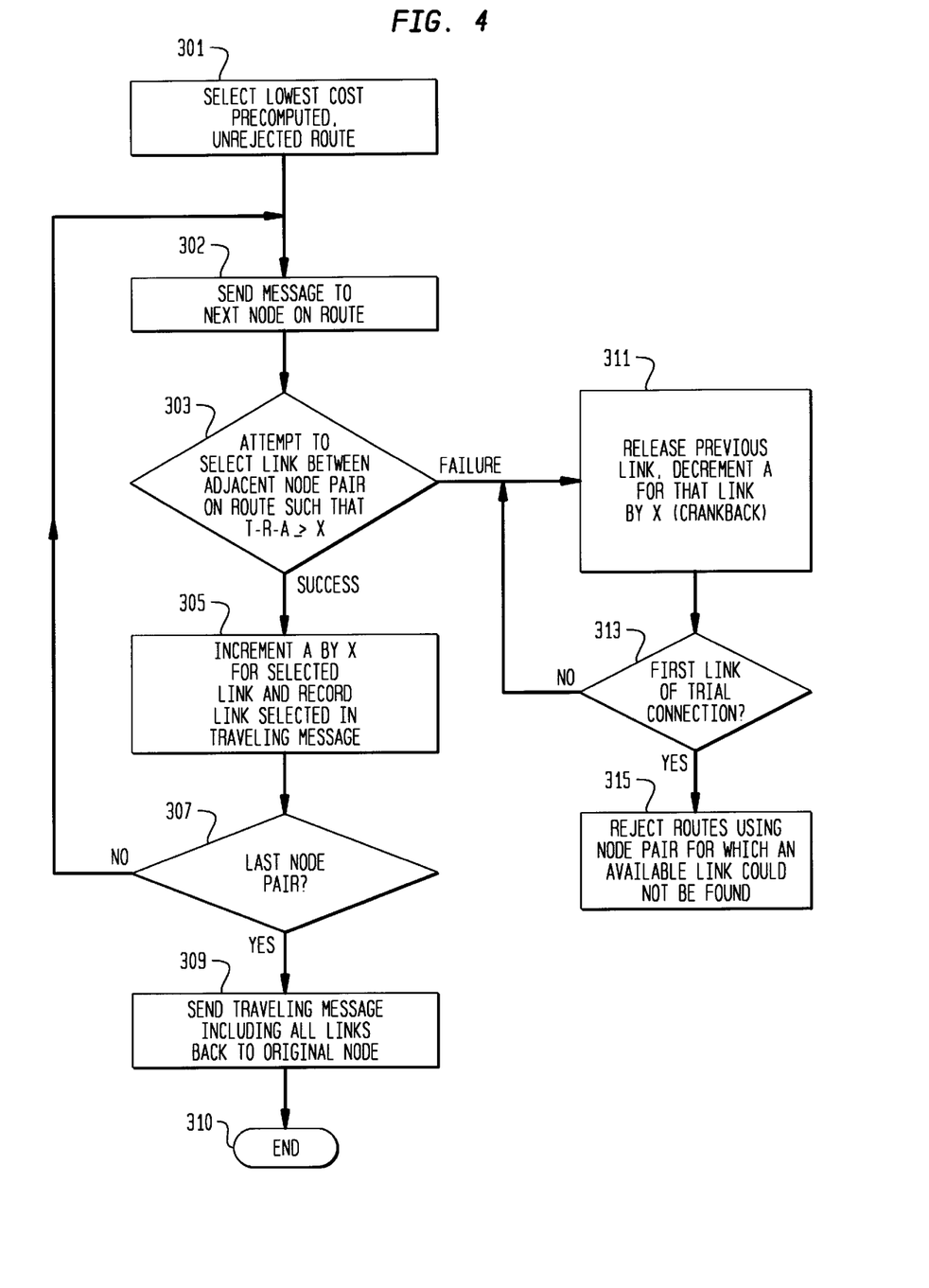
FIG. 4 illustrates the process of selecting a path in the data network.

The details of the operation of applicant's invention can best be followed through the flow charts of FIGS. 4–7. FIG. 4 is a flow chart illustrating the process of establishing a connection in accordance with the prior art, as modified in the prior art to include a reserve for rerouting in case of a failure. Each node has a series of precomputed routes for a connection to any other destination node. In response to a request to establish a connection a node connected to one of the end points of the connection selects (action block 301) the lowest cost precomputed route subject to certain performance constraints and not having been unsuccessfully tried for this call. Typically, the cost of a route is characterized by the number of nodes on the route and the occupancy level between pairs of those nodes. Thus, a three node route will tend to have a lower cost than a six node route and a route using relatively lightly loaded links will have a lower cost than a route using heavily loaded links. The concepts of costs of routes are well known in the field of traffic engineering, and many variations of this type of routing selection are known and used. A message is sent to the next node on the route to extend the path (action block 302).

Test 303 tests whether one of the next links on the route has sufficient available bandwidth (taking into account the reserve) to accommodate the new path. (The next link may be to the adjacent upstream node if that node was unable to find an available downstream node.) T is the total bandwidth of a link, R is the reserve requirement of the link, A is the amount of bandwidth already allocated to connections and X is the amount of bandwidth for the requested path. If T minus R minus A is greater than or equal to X, then the path can be accommodated on the link and the "success" output of test 303 is followed. This "success" output of test 303 results in the execution of action block 305 which causes the quantity A to be incremented by X, and a record of the selected link to be made in the traveling message that is sent from node to node to select a path. Test 307 then determines whether this is the last link of the path. If not, action block 302, thence test 303 is re-entered to check for the availability of adequate capacity on a link between the next node pair needing a link for the path. If it is the last link, then the traveling message is sent back to the originating node (action block 309) so that the originating mode can make a record of the selected path and complete the connection. End block 309 indicates that the path has been successfully connected. If the result of test 303 is negative, i.e., if there is insufficient capacity available on the link, other links connecting the same two nodes are tried to see if any of these links have adequate capacity. If so, that link is used for the path and the result of test 303 becomes positive. Otherwise, a crankback procedure comprising blocks 311, 313, and 315 is entered. Action block 311 causes the previous link of the path to be released by decrementing A for that link by X, thus undoing the action performed in action block 305. Test 313 then determines if this is the first link of the trial connection and if not, action block 311 is re-entered to release the previous link. If the result of test 313 is that this is the first link of the trial connection, then action block 315 is entered to cause the originating node to reject the use of routes using the node pair which supplied the negative result of test 303. Action block 301 is then re-entered to try to select the lowest cost precomputed, unrejected route.

Link bandwidth management is done differently when creating a contingent path vis-a-vis creating a path to be put into use for a connection. For each link and for each failure condition a quantity is maintained that represents the sum of the bandwidths of all connections that have a contingent path for the respective failure condition that has been given permission to use that link. Call this quantity the reserved bandwidth allocation to the failure condition. (It is referred to elsewhere in this application as Y(J) where J refers to the failure condition and indexing for the link id is suppressed.) This quantity must not be confused with, and indeed must never exceed, the bandwidth reserved on the link for accommodating connections moved to the link to recover them from the occurrence of some failure condition. This later quantity we elsewhere refer to as R, an assigned link attribute independent of failure condition. Note that the several Y(J) added over J for a link can far exceed R for the link, thus permitting connections to be protected with contingent paths with far less bandwidth withdrawn from the pool usable for the assignment of ordinary connections to the link.

Figure 5:
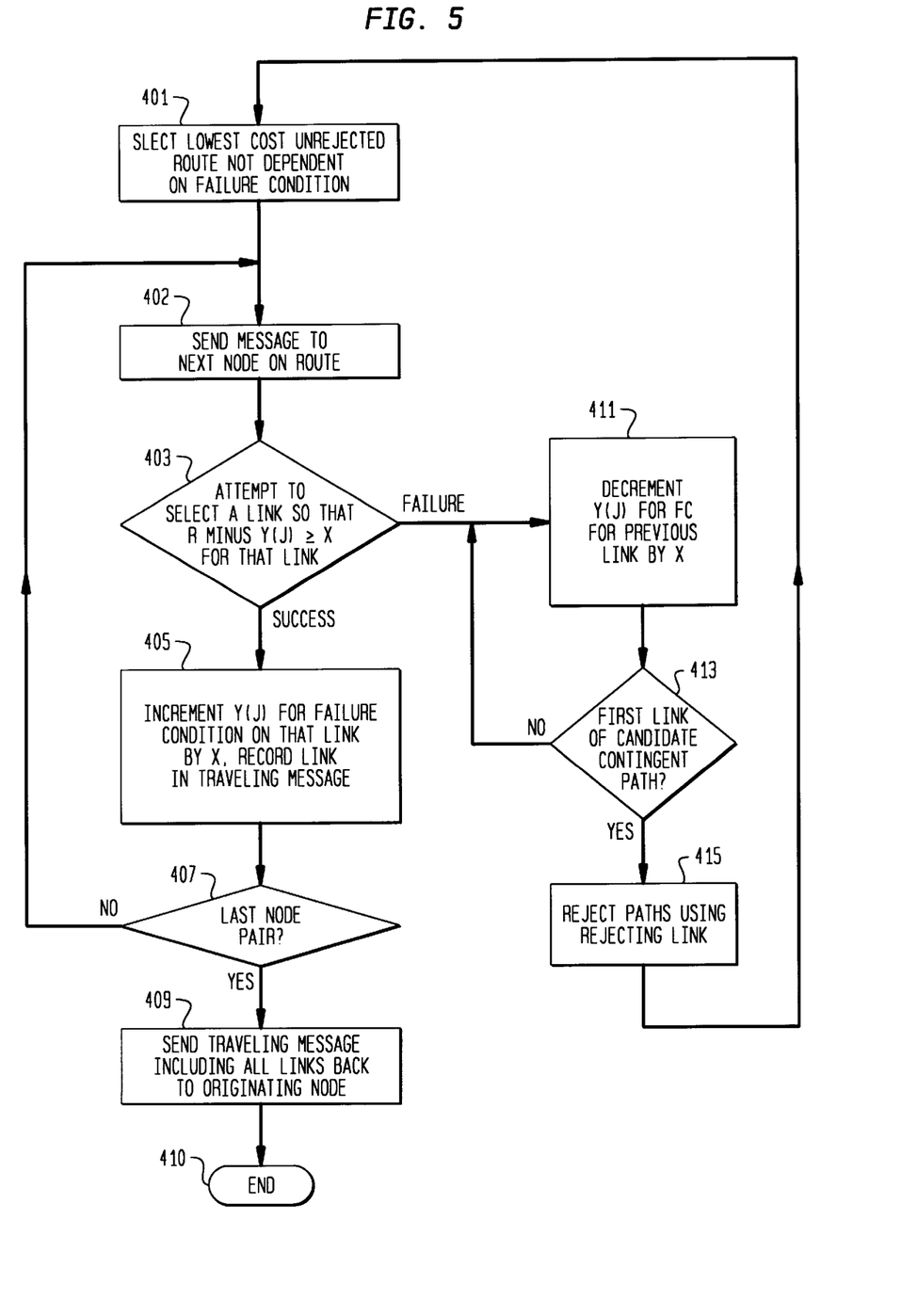
FIG. 5 illustrates the process of selecting a contingent path.

FIG. 5 is a flow diagram illustrating the process of calculating a contingent path. FIG. 5 is very similar to FIG. 4 except that: first, paths are not actually established; second, only paths which are not affected by the particular failure condition for which the contingent path is being calculated (at the originating node) are candidates for the contingent path; third, test 403 (at each node owning a link on the proposed contingent path) checks to see if sufficient reserve capacity is available to accommodate the contingent path for the failure condition J being addressed (i.e., R−Y(J)≧X); a success in test 403 leads to an incrementing by X of the reserve capacity Y(J) for the particular link and for the failure condition J being addressed; and during the process of cranking back for a rejected contingent path candidate, the allocated reserve Y(J) is decreased by X to undo the incrementing step of action block 405.

Contingent paths are calculated for each newly established path when processing time is available; deferring the calculation of contingent paths increases the likelihood that more replacement paths must be set up from scratch in case a failure occurs in the interim. If no contingent path for some failure condition with sufficiently low cost can be obtained, then the desired connection is entered into a file (block 280, FIG. 2) of connections lacking contingent paths. Not shown in the diagrams are processes for disconnecting connections and releasing their contingent paths. When a connection is disconnected, the amount of allocated bandwidth, A, is decreased by the amount of bandwidth occupied by the disconnected connection for each link that was occupied by the disconnected connection. Similarly, for each fault group applicable to the released connection, for each link along the corresponding contingent path, the reserved bandwidth allocated for that fault group, Y(J), is decremented by the bandwidth of the released connection.

Failure detection will now be considered. The owner node of a protected connection receives an indication that the protected circuit has been disrupted. This is another indication includes an identification of the link that caused the disruption. For example, in Asynchronous Transfer Mode (ATM) communications, the standards provide for an F4/F5 signal which can include an indication of the failed link. Each node can be provided with a table (Table 238, FIG. 2) associating each failed link with a fault condition. For more complex failure conditions, one or more nodes can analyze the pattern of disrupted connections, identify a failure condition, and broadcast the identity of the failure condition to other nodes. In some cases, special equipment can automatically identify the failure condition and cause all nodes to be notified of this failure condition.

Figure 6:
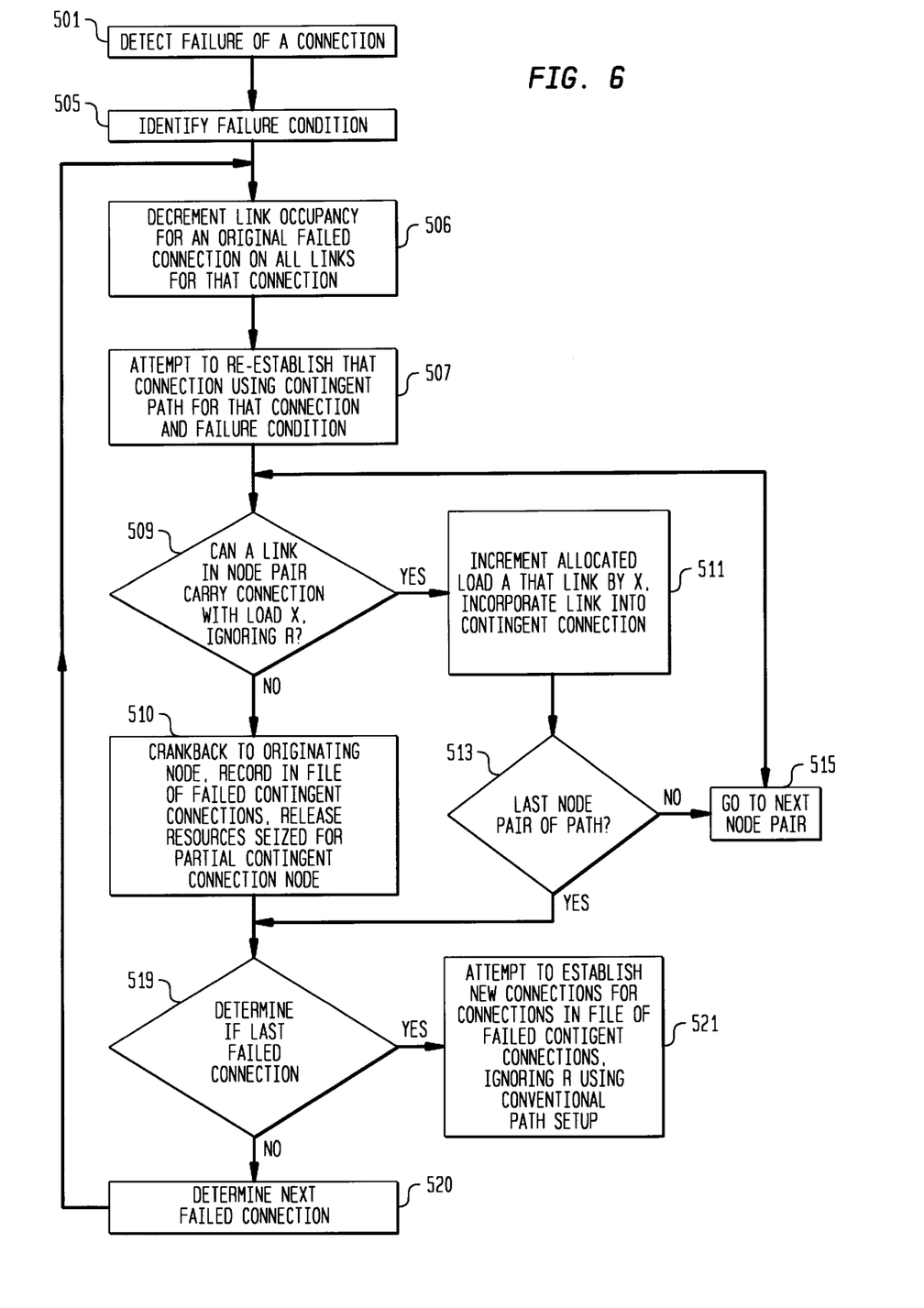
FIG. 6 illustrates the process of establishing a connection corresponding to a contingent path in case of a failure.

FIG. 6 illustrates the use of precomputed contingent paths in the event of a network failure. In action block 501 the network detects a failure of some connection. Based on this information, perhaps from a number of failed connections, and/or other failure indicators, a failure condition is identified (action block 505). The link occupancy for an original failed connection is decremented by X on all its links (action block 506). In action block 507, an attempt is made to re-establish the failed connections using the previously calculated contingent paths for each such connection and that failure condition. In re-establishing these connections, the reserve requirement is allowed to go to zero for any link in the path. Test 509, the test for permitting link bandwidth to be allocated to the rerouting connection is the following: the bandwidth of all existing connection on the link plus the bandwidth of the proposed rerouting connection is equal to or less than the bandwidth of the link. If the assumption that no more than one failure condition occurs at any one time holds, then all contingent paths for that failure group should be available to be set up as connections, i.e., should find adequate bandwidth on each of their links. However, in case of incomplete recovery from a previous trouble condition (recovery is described in FIG. 7) or in case of multiple occurring failure conditions, it is desirable to have link bandwidth tests even in the course of setting up the previously calculated contingent path as actual connections. Accordingly, test 509 determines whether the link can carry the extra traffic of the rerouting connection. If not, then the attempted connection is cranked back to the source node, restoring availability of X amount on traffic on intermediate links, (action block 510). The failure of the contingent path is recorded in table 285 (FIG. 2). Following execution of action block 510, test 519 checks whether this is the last path to be re-established; if not action block 520 is entered to determine the next path to be re-established.

If test 509 succeeds, then action block 511 is used to increment the carried load on the link by the rerouted connection and test 513 is used to determine if this is the last link. If not, then test 509 is re-entered on behalf of the next link on the contingent path and the loop is re-executed. If test 513 determines that this is the last node pair, then test 519, previously described, is entered in order to determine whether this is the last connection originating from this node and affected by the identified failure condition. If not, then the next connection to be tried is determined (action block 520). Then action block 506 is re-entered to begin work on rerouting another failed connection.

If this is the last connection, then an attempt is made to establish new connections for the paths accumulated in the file (table 285, FIG. 2) of contingent paths which could not be established. In action block 521 new paths can be established using the same link bandwidth management rules as in block 509. The process of establishing these new connections is essentially the same as establishing ordinary connections, except that the reserve requirement is ignored.

Note that while the process of reestablishing interrupted connections over new paths is shown as being sequential in order to simplify the explanation, in practice it is highly parallel; multiple contingent reroutes can be launched in parallel without waiting for any one of them to finish.

Figure 7:
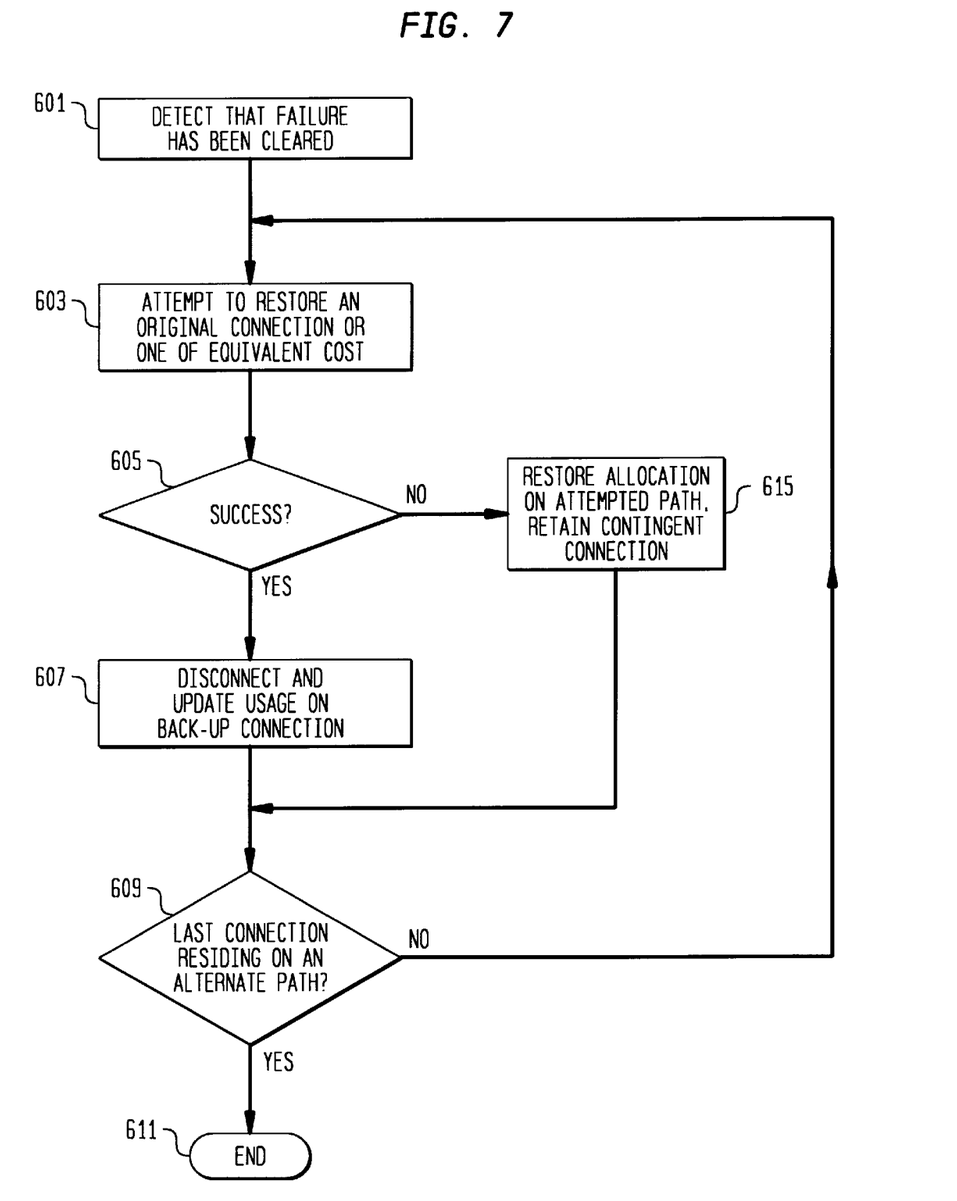
FIG. 7 illustrates the process of restoring original paths in the network following the repair of a failure condition.

FIG. 7 is a flow diagram describing actions performed when a failure has been cleared. In action block 601 it is detected that the failure has been cleared. In action block 603 an attempt is made to restore the original path of a connection residing on an alternate path due to the failure having interrupted its original path. Test 605 is used to determine whether this was successful. If not, then the bandwidth allocation of the original path links prior in the path to the blocking link are restored to their previous value and the contingent connection remains up (action block 615). If the attempt to restore the path is successful, then the bandwidth allocation on the back-up connection is updated to reflect that the back-up connection is no longer being used (action block 607). Following either action block 615 or action block 607, test 609 is used to determine whether this is the last connection residing on an alternate path. If not, then action block 603 is re-entered for another connection residing on an alternate path. If this is the last such connection, then this is the end of the process (end block 611).

When because of changes in the network configuration, a connection ceases to be dependent on a first failure condition and becomes dependent on a second failure condition, then the following must be done: the contingent path associated with the connection/failure condition pair and all its associated resources must be released, and a new contingent path for that connection and the second failure condition pair must be calculated, and the resources reserved.

Note that while the preferred embodiment is for connection oriented packet networks, the invention can also be used in synchronous circuit networks. There, instead of using bandwidth as a continuous quantity, bandwidth on a link quantizes carrying capacity in terms of a number of circuit channels (e.g., time slots). The bandwidth of a connection is then the bandwidth needed on a link to accommodate the connection. Bandwidth is a measure of capacity and reserve.

Many other implementations can be designed by those of ordinary skill in the art, without departing from the scope of the invention. The invention is only limited by the attached claims.

I claim:

1. In a connection oriented network for carrying communications over connections, a method of protecting a plurality of connections against the occurrence of one of a plurality of anticipated failure conditions comprising the steps of:

providing all nodes in the network with a common definition of the anticipated failure conditions;

providing for a plurality of links of said network a reserve capacity of bandwidth not to be used for normal connection establishment;

following the establishment of a protected connection, selecting a contingent path for the established protected connection for each anticipated failure condition which affects the protected connection, without using more than residual reserve capacity available for that failure condition on each link of said contingent path;

for each link, for each anticipated failure condition, maintaining a record of reserve capacity allocated for contingent paths of the anticipated failure condition over said link for said plurality of protected connections; and responsive to detection of one of said anticipated failure conditions and failure of one of said protected circuits, establishing a connection corresponding to the selected contingent path for said one of said anticipated failure conditions and the failed one of said protected circuits.

2. The method of claim 1 wherein the responsibility for initiating recovery of a failed connection is assigned to a node at one end of the failed connection, further comprising the steps of:

in the assigned node, storing the contingent path for said established protected connections for each of said anticipated failure conditions, and responsive to detection of one of said anticipated failure conditions, attempting to re-establish each failed one of said plurality of connections over the contingent path stored for said each failed one of said plurality of connections for the detected anticipated failure condition.

3. The method of claim 2 wherein the step of attempting to establish a connection corresponding to the contingent path stored for said one of said anticipated failure conditions and a failed one of said protected connections, comprises the steps of:

in each node controlling a link of said contingent path, testing whether adequate total capacity, including reserve capacity, remains for establishing the connection over the contingent path; and establishing said connection corresponding to said contingent path if and only if each link has adequate remaining total capacity.

4. The method of claim 1 wherein the step of selecting a contingent path comprises the step of selecting said contingent path in essentially the same way as regular paths are established, except that each node controlling a link of said contingent path checks whether the link has adequate available reserve capacity for the failure condition of the contingent path;

whereby available reserve capacity is separately maintained for each failure condition, decremented by the bandwidth of each connection whose contingent path for the respective failure condition includes the link, and the sums of the reserve capacity set aside in a link for contingent paths for different failure conditions can be much greater than the reserve capacity of the link.

5. The method of claim 1 wherein a source node of a protected connection initiates the search for contingent paths and the establishment of a connection corresponding to the contingent path for the protected connection in case an anticipated failure condition occurs.

6. The method of claim 1 further comprising the steps of;

if a connection corresponding to a contingent path for a failing one of said protected paths cannot be established, or if no contingent path has been selected, selecting and establishing a new alternate path for said failing one of said protected paths.

7. The method of claim 1, wherein the step of selecting said contingent path comprises a step of selecting a route (list of nodes) for said contingent path, and wherein the step of selecting a route is controlled by a node at one end of said established protected connection.

8. In a connection oriented network, comprising a plurality of nodes, for carrying communications over connections, a node of said networks comprising:

terminations for links for connecting said node to other nodes of said network;

a switching network fabric for switching communications between said links; and processor means comprising memory means for controlling said switching network fabric for establishing communications connections between ones of said links;

said processor means operative under control of a program stored in said memory means for:

initializing tables in said memory means, said tables comprising data based on a common definition of a plurality of anticipated failure conditions, and for providing a reserve capacity of bandwidth not to be used for normal connection establishment for links under the control of said node;

controlling establishment of a protected connection;

controlling selection of a contingent path for the established protected connection for each of said anticipated failure conditions which affect said protected connection, without using more than a residual reserve capacity available for that failure condition on each link of said contingent path;

for each link owned by said node, for each anticipated failure condition, maintaining a record of reserve capacity allocated for contingent paths of the anticipated failure condition over said link; and responsive to detection of one of said anticipated failure conditions, and failure of said protected connection, controlling establishment of a connection corresponding to the selected contingent path for the failed protected circuit.

* * * * *